Patented Dec. 23, 1930

1,785,916

UNITED STATES PATENT OFFICE

HERBERT SCHOTTE, OF BERLIN-WILMERSDORF, GERMANY, ASSIGNOR TO CHEMISCHE FABRIK AUF ACTIEN (VORM. E. SCHERING.), OF BERLIN, GERMANY

SULPHUR CONTAINING GUANIDINE DERIVATIVES AND PROCESS OF MAKING SAME

No Drawing. Application filed August 8, 1927, Serial No. 211,619, and in Germany August 4, 1926.

My invention refers to chemical products and more especially to a new type of sulphur-containing guanidine derivatives having the general formula

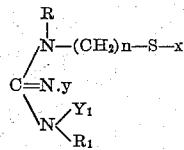

in which $n$ is a whole number, $x$ may be either hydrogen or the complex of atoms illustrated by that part of the above formula which is to the left of the sulphur atom, while R and $R_1$ may be similar or dissimilar and may be hydrogen or an univalent radical, and $y$ and $y_1$ either hydrogen or similar or different acyl radicals.

The new compounds are designed for use as pharmaceutical preparations. They are adapted to be oxidized and are not resistive against concentrated alkaline solutions. In contradistinction to the amines serving as starting products they cannot be distilled.

The new products are obtained by causing S-alkyl-isothiocarbamides having the general formula,

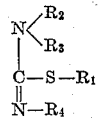

(wherein $R_1$ is an alkyl-group, while $R_2$, $R_3$ and $R_4$ are hydron or $R_3$ and $R_4$ may be acyl) preferably in the form of salts or acyl compounds to act upon sulphur-containing amine compounds.

Example 1

To 30 grams $\beta\beta'$-diamino diethyl sulfide are added in the absence of any solvent or in the presence of a small quantity of water or methyl or ethyl alcohol 90 grams S-ethyl isothiocarbamide hydrobromide. Heat is developed and there is obtained $\beta\beta'$-diguanido diethyl sulfide hydrobromide, which crystallizes out at once, melts at 162–163° C., and dissolves readily in water and less readily in alcohol.

The base corresponds to the formula

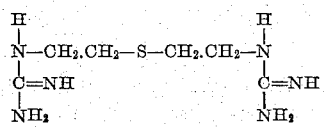

In this form the compound is soluble only with difficulty, but in the form of a salt of a mineral acid it dissolves in water rather readily.

Example 2

80 grams $\beta$-amino-ethyl mercaptan are added to 185 grams S-ethyl isothiocarbamide hydrobromide. Under development of heat the two compounds react with each other, the hydrobromide of guanidine mercaptan being formed, which is readily soluble in water, alcohol, and caustic potash solution. The corresponding base has the formula

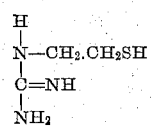

From the S-methyl isothiocarbamide hydroiodide can be obtained the corresponding salt of the hydroiodide acid, from the S-methyl-isothiocarbamide sulfate can be obtained sulfate.

Example 3

50 grams S-methyl-NN'-dibenzoyl isothiocarbamide are stirred with alcohol, 12 grams $\beta\beta'$-diamino diethyl sulfide are added under stirring and the mixture is slightly heated for some time. After removing the solvent and the mercaptan there remains over $\beta\beta'$ di-(N'N''-dibenzoyl guanido) diethylsulfide which forms a powder dissolving in all solvents only with difficulty. Its formula is

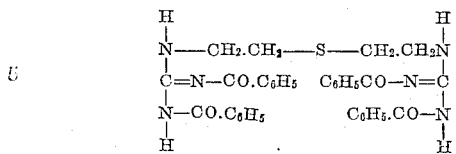

Various changes may be made in the details disclosed in the foregoing specification without departing from the invention or sacrificing the advantages thereof.

In the claims affixed to this specification the term "S-alkyl isothiocarbamide" is intended to include also the salts and acyl compounds.

I claim:—

1. As a new composition of matter, the sulphur-containing guanidine derivatives having the general formula

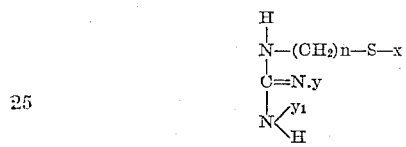

in which $n$ is a whole number $x$ may be either hydrogen or the complex of atoms illustrated by the part of the above formula to the left of the sulphur atom, and $y$ and $y_1$ either hydrogen or acyl radicals, such compounds being adapted to be oxidized and being non-resistive against concentrated alkaline solutions and incapable of being distilled.

2. As a new composition of matter, $\beta\beta'$-diguanido diethyl sulfide hydrobromide having the formula

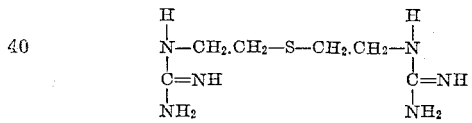

the compound being crystalline, melting at 162–163° C. and dissolving readily in water and less readily in alcohol.

3. The method of producing sulphur-containing guanidine derivatives, which comprises causing S-alkyl isothiocarbamide to act on aliphatic bivalent sulphur containing amines in which at least one hydrogen atom is bound to the nitrogen atom.

4. The method of producing $\beta\beta'$-diguanido diethyl sulfide hydrobromide, which comprises acting with S-ethyl isothiocarbamide hydrobromide, $\beta\beta'$-diamino diethyl sulfide.

In testimony whereof I affix my signature.

HERBERT SCHOTTE.